United States Patent
Keith et al.

[15] 3,635,841
[45] Jan. 18, 1972

[54] NOVEL ANTHRAQUINONE HYDROGENATION CATALYST

[72] Inventors: Carl D. Keith, Summit; Kurt W. Cornely, Westfield; Nathan D. Lee, Lambertville, all of N.J.

[73] Assignee: Engelhard Minerals and Chemicals Corporation, Newark, N.J.

[22] Filed: June 16, 1969

[21] Appl. No.: 833,678

[52] U.S. Cl. .........................................252/466 PT, 23/207
[51] Int. Cl. .....................................B01j 11/08, B01j 11/22
[58] Field of Search.....................................252/466; 23/207

[56] References Cited

UNITED STATES PATENTS

| | | | |
|---|---|---|---|
| 3,271,327 | 9/1966 | McEvay | 252/472 |
| 3,113,980 | 12/1963 | Robinson | 260/683 |
| 3,009,782 | 11/1961 | Porter | 23/207 |

OTHER PUBLICATIONS

Newsome, Tech. Paper #10, Alum. Co. of America, 1960 Pitt., Penn.

*Primary Examiner*—Daniel E. Wyman
*Assistant Examiner*—Philip M. French
*Attorney*—Eugene G. Seems, Frank Ianno and Milton Zucker

[57] ABSTRACT

A novel hydrogenation catalyst, especially useful for the catalytic hydrogenation of an anthraquinone working compound in the process for producing hydrogen peroxide, is described containing at least 0.05 percent by weight of metallic palladium dispersed on alumina supporting spheres, wherein the major crystalline structure of the alumina spheres is in the form of delta-alumina, theta-alumina, or mixtures of delta- and theta-aluminas and is substantially free of alpha-alumina, gamma-alumina or alpha-alumina monohydrate, wherein the alumina spheres have substantially no pores larger than about 0.06 micron, a BET surface area of over 20 m.$^2$/gm., and wherein the palladium metal penetration into the pores of the supporting alumina surface is no more than about 40 or 50 microns.

3 Claims, No Drawings 3,635,841

NOVEL ANTHRAQUINONE HYDROGENATION CATALYST

BACKGROUND OF THE INVENTION

1. Field of the Invention

This invention relates to a novel hydrogenation catalyst especially useful for producing hydrogen peroxide by the anthraquinone process in which the novel catalyst is used in the hydrogenation of an anthraquinone working compound.

2. Description of the Prior Art

It is known that anthraquinone compounds, e.g., 2-ethylanthraquinone, and their tetrahydro derivatives can be used as working compounds in a process for producing hydrogen peroxide. In this process, commonly known as the anthraquinone process, a working compound is dissolved in a suitable solvent, or mixture of solvents, to form a working solution and is alternately reduced and oxidized. During the reducing stage, the working compound is hydrogenated in the presence of a catalyst to reduce it to its "hydroquinone" form. In the subsequent oxidation step the hydrogenated working compound is oxidized with air, oxygen or other oxygen-containing gases to convert it to its "quinone" form with concomitant formation of hydrogen peroxide. The hydrogen peroxide product is then removed from the working solution, preferably by extraction with water, and the remaining working solution is recycled to the hydrogenator to again commence the cyclic process for producing hydrogen peroxide. The detailed operation of this process is described fully in U.S. Pat. Nos. 2,158,525, 2,215,883 and 3,009,782.

In the above-described process, the catalytic hydrogenation conventionally is carried out in either a "fluid bed" or a "fixed bed." In a "fluid bed" the catalyst has a size of about 20 to 200 mesh (0.8 to 0.07 mm.) and is kept suspended in a portion of the working solution which is maintained in the hydrogenator. The working solution and hydrogen are passed through the catalytic hydrogenator continuously, and the suspended catalyst is mildly agitated to promote hydrogenation of the working solution. In a "fixed bed" the catalyst, normally having a size of 3 to 65 mesh (0.2 to 6 mm.), is supported in a fixed position, preferably between porous support plates or screens, and both hydrogen and the working solution are passed simultaneously through the supported catalyst mass either concurrently or countercurrently. In this system, the catalyst is never suspended in the working solution.

One of the major costs of operating the above-defined anthraquinone process for producing hydrogen peroxide is the cost of the catalyst. Periodically, as its activity decreases with time, the catalyst must either be reactivated or replaced in order to maintain the desired rate of hydrogenation of the anthraquinone working compound. Accordingly, any technique which will permit greater amounts of hydrogen peroxide to be produced in a commercial plant by an existing catalyst bed or which would permit a plant to produce its normal quota of peroxide using smaller amounts of catalyst and fewer shutdowns for reactivation and/or replacement of the catalyst is most desirable, because it reduces the cost of operating the process.

The catalysts which have generally been employed comprise the so-called Raney nickels or noble metals, such as platinum, rhodium and palladium, with palladium being preferred. While Raney nickel is an excellent hydrogenating catalyst, it suffers the drawback of readily being poisoned by oxygen and hydrogen peroxide. The extremely involved and careful filtration and extraction that is required to remove traces of hydrogen peroxide or oxygen prior to recycling the working solution to the hydrogenation stage, renders the use of this catalyst uneconomical. Moreover, nickel catalysts cannot be regenerated and must be replaced when catalytic activity falls off.

In an effort to overcome these serious disadvantages of Raney nickel catalysts, noble metal catalysts, particularly those employing palladium, were developed. One such catalyst is described in U.S. Pat. No. 2,657,980, issued to Sprauer, in which palladium metal is deposited on an activated alumina carrier; the activated alumina is defined as one containing alpha-alumina monohydrate, gamma-alumina, or both. Such catalysts give acceptable conversion of the "quinone" to the "hydroquinone" substituent, without being poisoned by residual hydrogen peroxide or oxygen and further can readily be regenerated when its activity falls off.

In the fabrication of these catalysts, palladium metal is typically deposited on a crushed aggregate carrier having a size of 2 to 200 mesh. The larger size catalyst particles, e.g., 3 to 65 mesh, are useful in fixed bed catalytic reactors, while the finer particles are normally used in fluid-bed-type catalytic hydrogenators. One serious difficulty with these catalysts resides in the fact that the palladium, which is deposited on the crushed aggregate support, has a tendency to preferentially deposit as relatively thick layers in the cracks and crevices of the crushed aggregate support, rather than depositing as a coating of uniform thickness over the external geometric surface of the crushed aggregate particles. This tendency of the metal to preferentially deposit in thick layers in the areas of the cracks and crevices is particularly true for catalyst supports that have a relatively low surface area measured by the BET (Brunauer, Emmett and Teller) method, described by Brunauer, Emmett and Teller in their article, "Adsorption of Gases in Multimolecular Layers" in *The Journal of the American Chemical Society*, Volume 60, page 309, Feb. 1938, and as described in detail by S. J. Gregg and K. S. W. Sing in their book, *Adsorption, Surface Area and Porosity*, published in 1967 by the Academic Press of London and New York. Typical low surface area catalyst support materials include corundum, dolomite, quartz, silicas and carbides. Since much of the palladium deposited on the crushed aggregate supports is covered by other palladium metal in the form of relatively large crystallites, all of the metal is not available for use in the catalytic reaction. Moreover, when crushed aggregate catalysts are used in the makeup of a fixed bed, some of the poorly coated projections on one particle will rest in a crevice of an adjacent particle, and this, in turn, also tends to cover part of the available metal-coated catalytic surface. Further, when operating a fixed bed using a liquid and a gas flowing concurrently through the bed, the working solution has a tendency to fill the remaining space available in cracks and crevices with liquid, due to the surface tension of the liquid, thereby giving poor gas liquid distribution in the catalytic bed. In some cases it has also been observed that the metal that deposits on the more accessible areas of the crushed aggregate carrier is poorly bonded to the surface and is easily lost in use. All of these factors tend to reduce the efficiency of a catalyst using a crushed aggregate carrier for the desired hydrogenation reaction.

Attempts have been made to overcome the deficiencies of the above crushed aggregate supported catalyst by preparing spherical supports from alpha-alumina monohydrate and gamma-alumina or both. Unfortunately, when used in the anthraquinone hydrogen peroxide process, palladium metal deposited on this type of supports has a rather short active life. The small amounts of water which are inherent in the process apparently attrit the metal from the surface of the alpha- and/or gamma-alumina spheres. Apparently, the metal cannot adhere as tenaciously to these types of supports as it can to the crushed aggregate type of support.

SUMMARY OF THE INVENTION

We have now discovered a novel catalyst which is especially useful in the catalytic hydrogenation of an anthraquinone working compound for producing hydrogen peroxide in that this new catalyst has an unexpected, high level of catalytic activity and surprisingly retains its activity for prolonged periods of use without the need for regeneration and without attriting metal from its surface; the catalyst contains at least 0.05 percent (preferably between 0.1 to 5 percent) by weight of metallic palladium dispersed essentially uniformly over the surface of alumina supporting spheres, said alumina supporting spheres having their major crystalline structure in the form of delta-alumina, theta-alumina, or mixtures of delta-alumina and theta-alumina, and being substantially free of alpha-alumina, gamma-alumina or alpha-alumina monohydrate, wherein the alumina spheres have substantially no pores whose diameters are larger than about 0.06 micron, a BET surface area of over 20 m.$^2$/g. (square meters/gram) and wherein the palladium metal penetration into the pores of the supporting alumina surface is no more than about 40 to 50 microns.

DESCRIPTION OF THE INVENTION AND THE PREFERRED EMBODIMENTS

In carrying out the present invention, the alumina catalyst support is first prepared as follows. Initially, an aqueous, hydrous alumina slurry containing boehmite and amorphous hydrous alumina is prepared in which one part of amorphous hydrous alumina is present to 1–4 parts boehmite. This alumina slurry is prepared by hydrolyzing finely divided alumina particles having a surface area of about 75 thousand to 1 million m.$^2$/g., wherein the general particle size of the alumina is about 2 to 100 microns, with preferably at least 50 percent of the particles being from 10 to 40 microns. Such alumina is usually one in which at least about 90 percent can pass through a 325-mesh sieve (U.S. Standard Sieve Series). This fine alumina is reacted with liquid water in the presence of a water-soluble lower fatty acid, preferably a saturated lower fatty acid having from one to two carbon atoms, such as formic acid, acetic acid, trichloroacetic acid, and the like. Of these, formic acid is preferred. The reaction is run by maintaining a ratio of about 1 mole of the organic carboxylic acid per 2 to 30 gram-atoms of aluminum and at least about 18 moles of water. This reaction is run at a temperature of about 60°–250b$L$ C. and at a pressure sufficient to maintain a liquid phase. At the above ratios, the reaction mixture normally remains in the pH range of about 3 to 5. The resulting slurry normally has a concentration of about 5 to 12 percent alumina. The method for preparing this aqueous hydrous alumina slurry is disclosed in U.S. Pat. No. 3,429,660, issued to Carl D. Keith et al. on Feb. 25, 1969.

The resulting aqueous hydrous alumina slurry is formed into spheres by dispersing the slurry into uniform particles of a desired size and dropping these particles into a column of water-immiscible liquid (e.g., a mixture of 77 percent by volume of a mineral oil having a viscosity of 65/75 SUS and 23 percent by volume carbon tetrachloride) containing a coagulating agent. The preferred coagulating agent is gaseous ammonia, and it is preferably passed upwardly through the column of water-immiscible liquid in countercurrent flow to the drops of alumina slurry. As the drops descend in the column, essentially firm spheroidal particles are formed. The resulting spheroidal particles are collected at the base of the column, separated from the water-immiscible liquid, and aged in a dilute aqueous ammonia solution, e.g., a 6 percent aqueous ammonia solution, preferably for at least about 15 minutes. They are then water-washed and dried until they contain no more than about 5 percent free water by passing a heated air stream, having a temperature over 100° C., over the spheroidal particles.

In a preferred mode of operation, a filler or thickening agent, such as calcined gamma-alumina, is added to the hydrous alumina slurry in amounts sufficient to constitute up to 65 percent of the total alumina slurry, although amounts of from 20 to 50 percent are preferred. Other optional additives, such as water-soluble starches, can also be employed, if desired.

The dispersing means effective in forming uniform drops of the above slurry having a desired size are a multiplicity of hypodermic syringe needles. These needles, depending on internal diameters, will dispense varying size drops of the hydrous alumina slurry into the water-immiscible liquid and thus regulate the size of the resulting spheroids. Other such effective dispersing means can also be used in the practice of this invention. This method of preparing these alumina spheroidal particles is described in detail in application, Ser. No. 513,393, filed Dec. 13, 1965, now abandoned, in the name of Carl D. Keith et al.

These alumina spheroidal particles thus produced are then calcined by heating them at temperatures of from 850° to 1,200° C., and preferably 900° to 1,100° C., until they are converted essentially to either delta-alumina, theta-alumina or mixtures thereof. This heating period may range from 30 minutes at the higher temperatures up to 12 hours at the lower temperatures, the exact time varying from sample to sample and depending on the type of heating equipment used. Preferably, calcination at temperatures of 950° C. for about 4 hours has been found to yield good results without undue heating periods. The calcination stage converts the alumina to the desired crystalline form of alumina and also yields the desired pore structure and overall surface area. In general, the resulting alumina spheres may be produced in sizes of from 3 to 200 mesh, and substantially none of their pores are larger than about 0.06 micron in diameter with few pores between about 15 microns and about 0.06 micron. The method for determining the pore structure is set forth below. Further, these alumina spheres have a BET surface area of above about 20 m.$^2$/g. up to about 200 m.$^2$/g., with about 90 to 110 m.$^2$/g. being the most common. The form of alumina in the spheres is essentially either delta-alumina or theta-alumina, or mixtures thereof, depending on the calcining conditions employed.

The resulting calcined spheroidal alumina particles are then treated to deposit palladium metal uniformly on their surface by established techniques. The palladium may be deposited by impregnating the alumina spheres with a water-soluble inorganic salt of the palladium metal, e.g., sodium palladium chloride, palladous chloride, chloropalladous chloride, and the like, which are known in the art. The palladium is then precipitated in either its free state or in a chemically combined form, e.g., palladium oxide, on the surface of the spheroidal alumina particle. The palladium metal, thus deposited, is then activated and/or reduced by conventional reducing agents, such as formaldehyde, sodium formate, hydrazine salts, hydrogen, and the like. Enough palladium is deposited so that at least 0.05 percent (and preferably 0.1 to 5 percent) by weight palladium is deposited on the spheroidal carrier. The surface configuration of the present spheroidal alumina permits the palladium to form an adherent, uniform deposit over the entire surface of the alumina and to penetrate into the pores of the alumina surface no more than about 40 or 50 microns.

The present catalyst, thus produced, has many advantages over catalysts of the prior art. Initially, the palladium metal is substantially uniformly deposited only on the surface of the alumina sphere, thereby permitting maximum exposure of the metal for catalytic use. The palladium is held in a cohesive, substantially uniform coating on the surface of the sphere by virtue of the relatively small diameter capillary pores which are in close proximity to one another and which adhere the palladium coating to the surface of the alumina sphere. Further, since this alumina support is not affected by any unavoidable water in the anthraquinone working solution, the metal does not attrit from the alumina sphere even if small amounts of water contact the catalyst.

The outstanding property of the present catalyst is its extremely high activity level and, most unexpectedly, the finding that it retains this high activity level without the need for regeneration. This is completely unexpected, compared to the prior art catalysts. For example, after several hundred to over 1,000 hours of operation, the instant catalyst retained over 97 percent of its original activity without regeneration. Ordinarily, prior art catalysts, such as palladium metal on alpha-alumina or dolomite, have to be periodically regenerated every 48 to 96 hours when used in the anthraquinone process for making hydrogen peroxide.

The present spherical shaped catalyst also has other advantages. When used in a packed, fixed bed hydrogenator, there is essentially point contact between the catalytic spheres, thereby resulting in maximum exposure of the catalyst surface to the anthraquinone working solution and to hydrogen. This undoubtedly is a factor in the high level of activity which this catalyst possesses. In addition, the high metal dispersion gives more efficient utilization of the palladium metal on the catalyst, and therefore less palladium is required in a given catalytic hydrogenator to achieve maximum hydrogenation activity.

In general, the instant catalyst must have a support that consists essentially of delta-alumina, theta-alumina, or mixtures thereof. These types of aluminas have been found to give a support which is not attacked by the anthraquinone working solution or any components thereof, including unavoidable amounts of water. Further, these types of aluminas permit the fabrication of a support that has substantially none of its pores larger than about 0.06 micron in diameter. Normally, the instant alumina support has essentially few pores between about 15 microns and about 0.06 micron. Such an alumina has a BET surface of above 20 m.$^2$/g. and normally approaches values of about 90 and above, e.g., 200 m.$^2$/g. The "total pore volume" of the alumina, which is a measure of the total volume of pores and opening smaller than about 100 microns in diameter per unit weight of sample, is greater than 0.25 cc./g. and preferably is greater than 0.4 cc./g. These fine pores aid in maintaining catalytic activity and in retaining the coated palladium on the surface of the alumina, even though the palladium penetration into pores of the supporting alumina surface is no more than about 40 to 50 microns.

The porosity of the alumina support spheres is determined by measuring the volume of sample that is penetrable by mercury when the pressure is increased from 1.8 to 5,000 p.s.i. absolute. The porosity of a sample can be determined readily using an Aminco-Winslow porisometer, manufactured by the American Instrument Company, Incorporated, of Silver Spring, Md., which is designed to permit pressures of up to 5,000 p.s.i. absolute to be exerted on mercury used to penetrate the pores. In using this technique, a sample is initially subjected to mercury under a pressure of 1.8 p.s.i. absolute. At this pressure, the mercury penetrates all voids and surface cracks which are larger than 100 microns. As the pressure of the mercury is increased, up to 5,000 p.s.i. absolute, the mercury penetrates increasingly smaller pores in the sample. The pressure necessary to penetrate pores of a given diameter is known, and the volume penetration can be plotted against pore size (diameter). In this way, the volume of the pores corresponding to any given pore size can be determined for a sample. Additionally, the cumulative volume of mercury penetrating the sample up to 5,000 p.s.i. absolute can also be determined. The term "pores" as used in the specification and claims excludes all voids, surface cracks and openings larger than 100 microns.

The instant catalyst is especially useful in the anthraquinone process for catalytically hydrogenating anthraquinone compounds. In this process a working solution is made up by dissolving an anthraquinone working compound, which can be alternately reduced and oxidized to produce hydrogen peroxide, in a suitable organic solvent. The working solutions that can be used in this process are those that contain anthraquinone working compounds, such as 2-ethylanthraquinone or the 2-isopropyl-, 2-sec-butyl-, 2,5-butyl-, 2-sec-amyl-, 2-methyl- or 1,3-dimethyl derivatives of anthraquinone, as well as other anthraquinones well known in the hydrogen peroxide art. The preferred working compound is 2-ethyl anthraquinone and its tetrahydro derivatives.

These working compounds are dissolved in at least one organic solvent to form the anthraquinone working solutions; two or more mixed organic solvents may be used to enchance the solubility of an anthraquinone working compound in both its hydrogenated form, i.e., the "hydroquinone" form and its oxidized form, i.e., the "quinone" form. Many such solvents and mixtures of solvents are known to be useful for dissolving the anthraquinone working compound in both hydrogenation and oxidation stages. Solvents made up of mixtures of compounds, such as benzene, toluene, and the like, with an alcohol, such as amyl alcohol cyclohexanol, and the like, have been suggested and used for this purpose. Particularly useful solvent mixtures for the anthraquinone process include, but are not limited to, alkyl benzenes containing nine to 11 carbon atoms, and trialkyl phosphate esters. A preferred solvent mixture for use in this anthraquinone process is a mixture of $C_9$ and $C_{10}$ alkyl benzenes with tris(2-ethylhexyl)phosphate.

In using the present catalyst, the above anthraquinone working solution is passed into a catalytic hydrogenator containing the instant catalyst along with gaseous hydrogen, and the working compound dissolved in the working solution is hydrogenated. Any means commonly employed for contacting working solutions with a hydrogenation catalyst and hydrogen may be employed in the hydrogenator when using the present catalyst. Normally, the catalytic hydrogenation is carried out in either a "fluid bed" or a "fixed bed" hydrogenator. In the "fixed bed" method the above catalyst, having a particle size of from about 3 to about 65 mesh, is supported in a fixed position, preferably between porous support plates or screens, in a deep bed, and the working solution and hydrogen are passed simultaneously through the supported catalyst mass either concurrently or countercurrently. The essential feature of this operation is that the catalyst remains in a fixed position without moving within the catalytic hydrogenator.

In a "fluid bed" type hydrogenator, the catalyst is usually of small size, e.g., 20 to 200 mesh and is kept suspended in a portion of the working solution which is maintained in the hydrogenator. The working solution and hydrogen are passed through the catalytic hydrogenator continuously, and the suspended catalyst is mildly agitated to promote hydrogenation of the working solution. Generally, this agitation is achieved by passing a rising stream of hydrogen near the bottom of the hydrogenator in an amount sufficient to create turbulence throughout the working solution containing the suspended catalyst.

In the hydrogenation stage, conventional temperatures and pressures known to be useful in producing hydrogen peroxide by the anthraquinone process can be utilized. The fixed bed hydrogenator can be operated at pressures of between about 5 and about 100 p.s.i.g.; typically pressures of between about 30 and 60 p.s.i.g. are conventional. While superatmospheric pressures are preferred, the process can be operated at atmospheric pressure, and in some cases, at subatmospheric pressure. The hydrogenator can be operated at temperatures between ambient (about 20° C.) up to 150° C.; typically fixed bed operations are normally between 20° and about 70° C., and preferably at temperatures of about 45° to about 55° C.

Under the normal conditions of operation, the proportion of working compound which is hydrogenated per pass (depth of hydrogenation) through the catalytic hydrogenator normally is at least about 40 up to 80 percent. If higher depths of hydrogenation are desired, these may be carried out readily, but with some increase in the formation of degradation products.

The working solution, after leaving the catalytic hydrogenator, is passed into an oxidizer where it is contacted with air or oxygen. In the normal mode of operation, the working solution flows continuously into the base of an oxidizing tank and is removed as oxidized overflow through a standpipe at the top of the oxidizing vessel. Air, oxygen or other oxygen-containing gas is pumped into diffusers or other gas-dispersing means located at the base of the oxidizing vessel and is released as a continuous upward flow of dispersed bubbles passing through the working solution. The oxidation reaction normally takes place at atmospheric pressures, although subatmospheric or superatmospheric pressures may be employed in the oxidizer. Temperatures of from about ambient (about 20° C.) up to about 65° C. can be employed in the oxidizer, although 45° to 55° C. is preferred. During this oxidation stage, the anthraquinone working compound is oxidized to its "quinone" form with concomitant release of hydrogen peroxide.

The oxidized mixture is removed from the oxidizer and subjected to a water extraction in a conventional extractor to dissolve the hydrogen peroxide, preferentially, in the aqueous extract phase. The raffinate and water extract are then permitted to separate into an organic phase and a water phase. The water phase, containing most of the hydrogen peroxide, is separated from the organic phase and passed to distillation units to purify and concentrate the hydrogen peroxide, while the organic phase, made up essentially of the working solution, is recycled to the hydrogenator to once again commence the cycle for producing hydrogen peroxide.

The following examples are given to illustrate the invention, but are not deemed to be limiting thereof.

EXAMPLE 1

Preparation of the Catalyst

To a 1-liter, fluted, three-necked Pyrex flask fitted with a high-speed two-bladed agitator, a reflux condenser and a thermoregulator were added 500 cc. of deionized water, 1 cc. of 88 percent formic acid and 6.25 grams of atomized aluminum metal (99.5 percent purity, surface area of 310,000 mm.$^2$/g.; particle size distribution of 5–50 microns). The agitator was set to rotate at 1,800 r.p.m. and the reaction was initiated at room temperature. As the temperature rose, the rate of hydrogen production increased. The temperature was allowed to reach 100° C. and maintained at this temperature. At the end of 1.5 hours an additional 6.25 grams of aluminum metal and 10 cc. of 0.684 molar formic acid were added to the reaction mixture. Further equal additions of aluminum metal were made at 3.5, 4.5, 5 and 6 hours total reaction time, so that a total of 25 grams of aluminum metal had been added. During the time interval of 2–6 hours, 0.684 molar formic acid solution was added until a total of 0.095 moles of 100 percent formic acid had been added. The reaction was allowed to continue for a total of 12 hours at the end of which the reaction mixture was completely free of aluminum and had a pH of 3.4.

The resulting amorphous/boehmite slurry had a composition of 34 percent by weight amorphous alumina and 66 percent by weight boehmite (18 A. boehmite crystal size). This slurry composition was mixed with calcined gamma-alumina in amounts sufficient so that the added gamma-alumina represented 40 percent by weight of the total alumina in the mixture, and the mixture was agitated at high speed in a Waring blender to obtain the desired fluidity. The added calcined gamma-alumina had a particle distribution by weight of 4 percent 1.8–2.0 microns; 16 percent 2–5 microns; 35 percent 5–10 microns; 45 percent 10–22 microns. The resulting slurry was then fed to an oil column 10 feet in length and 4 inches in diameter via a cylindrical stainless steel head to which were attached 9- to 18-gauge hypodermic syringe needles. The slurry was supplied to this head by means of a peristaltic type pump so that there would be a constant discharge rate from the syringe needles. The immiscible medium employed in the oil column was a mixture of 77 percent by volume of a 65/75 SUS viscosity mineral oil and 23 percent by volume of carbon tetrachloride. Gaseous ammonia was added to the oil/carbon tetrachloride mixture at the rate of 1–5 ml./min. by means of a porous sparger located in the bottom portion of the column to substantially saturate the mixture. At the upper portion of the column there was attached an exhaust system so that the droplets emanating from the syringe needles would not coagulate immediately upon striking the free, ammonia-containing space above the oil/carbon tetrachloride level. As the droplets contacted the oil/carbon tetrachloride surface they immediately began to gel, and assumed a spheroidal shape which was retained and became more firm as they descended through the immiscible medium in the column. The spheres were collected in a suitable container attached to the bottom of the oil column. They were then drained free of oil, aged for 15 minutes in a 6 percent aqueous ammonia solution, washed with water, and dried by passing heated air at 110° C. over the spheres until no more than 5 percent free water remained. The spheres, having a size of about 10 mesh (2 mm. or about five sixty-fourths of an inch) were then calcined at 950° C. for 4 hours until the alumina was substantially all in the form of theta-alumina and delta-alumina, with the predominant form being the theta-alumina. The calcined spheres had a BET surface area of 90 m.$^2$/g. and a pore distribution, when tested on an Aminco-Winslow porisometer, in which substantially all the pores were smaller than about 0.06 micron. The pores were found to be present starting at about 0.06 micron to 0.035 micron in diameter, when measured at Hg pressures up to 5,000 p.s.i. absolute, the pressure limit of the testing apparatus. Substantially no pores were found between about 15 microns and about 0.06 microns. Total pore volume was 0.61 cc./g.

The above calcined spheres were then impregnated with an aqueous solution of sodium palladium chloride having a concentration of 1 percent by weight, expressed as palladium. Palladium was precipitated on the spheres by heating the impregnated spheres up to the boiling point of the solution. The metal-coated spheres were treated with excess 37 percent formaldehyde to activate the palladium metal. The spheres were then separated from the aqueous, sodium palladium chloride solution, water-washed and dried at 110° C. The deposited palladium constituted 0.3 percent by weight of the resulting catalyst and was uniformly and adherently deposited over the entire surface of the spheres, penetrating into the pores of the alumina surface no more than about 40 to 50 microns.

EXAMPLE 2

Run 1—Process of the Invention

An anthraquinone working solution was made up by mixing together 75 percent by volume of a commercially available, mixed aromatic solvent containing about 99.6 percent aromatics, having a boiling point range of 182° C. to 204° C. obtained from Shell Chemical Company and identified as Cyclosol 63 and having an aromatic content of about 82.3 percent $C_8$—$C_{12}$ alkyl benzene, 80 percent of which is $C_{10}$—$C_{11}$ alkyl benzene, and 13.3 percent cycloalkyl benzene, 3.5 percent $C_{10}$ diaromatic (naphthalene), with 25 percent by volume of tris(2-ethylhexyl)phosphate. Thereafter 10 percent by weight of 2-ethylanthraquinone was dissolved in the mixed solvent.

A fixed bed catalytic hydrogenator was prepared in a glass tube measuring 1 inch in diameter by placing the catalyst prepared in accordance with example 1 on a support screen in the glass tube until a depth of 3 to 4 feet was obtained. The exact depth of the bed is set forth in table I.

The above-defined working solution and an excess of gaseous hydrogen under a pressure of about 30 p.s.i.g. were passed concurrently downwardly through the catalyst bed at a flow rate of 73.5 l./min./sq.ft. of catalyst bed cross section. The temperature in the catalyst bed was maintained between 45° and 50° C. The hydrogenated working solution recovered from the base of the hydrogenator was pumped into an oxidizing vessel.

The stream of hydrogenated working solution passed into the oxidizer was then oxidized by passing air through the working solution until oxidation of the solution was complete. The temperature of the solution in the oxidizer was maintained at from 45°–55° C. The oxidized working solution was removed from the oxidizer continuously and passed into an extraction unit where it was subjected to water extraction to dissolve the hydrogen peroxide, preferentially, in the aqueous extract phase.

The raffinate and water extract were then permitted to separate into an organic phase and a water phase, and the water phase, containing most of the hydrogen peroxide, was separated from the organic phase. The remaining organic phase, which was made up essentially of the working solution, was recycled to the hydrogenator to again commence the cycle for producing hydrogen peroxide.

The above cyclic processing was carried out for periods of from 40-80 hours, as indicated in table I. The productivity of the catalyst in terms of pounds of hydrogen peroxide (100 percent basis) produced per day per pound of catalyst, as well as the amount of hydrogen peroxide produced in pounds of hydrogen peroxide per day per pound of palladium, was then determined for the catalyst. These are reported in table I.

Runs A, B and C—Prior Art Examples

The above procedure was repeated in runs A, B and C with the exception that known catalysts were employed. The catalysts, their property and their peroxide productivity are set forth in table I.

EXAMPLE 3

Runs 2, 3 and 4—Process of the Invention

The procedure of example 2, run 1 was repeated, except that larger sized equipment was utilized. One hydrogenator had a diameter of 5.4 inches, while another had a diameter of 5 feet, and the fixed beds therein had the depth specified in table II. In this example the 5.4-inch diameter hydrogenator was operated at 50-60 p.s.i.g. pressure and at a temperature of 48°-60° C. The second, 5-foot diameter reactor was run at 45-50 p.s.i.g. pressure and at a temperature of 50°-58° C. The working solution and excess hydrogen were passed into the top of the fixed beds at an average rate of 35 gallons per square foot of catalyst bed cross section per minute. Thereafter, the hydrogenated working solution was passed into the base of an oxidizing vessel, and air was passed up through the working solution until oxidation of the solution was complete. The temperature of the solution in the oxidizer was maintained at 45°-55° C. Thereafter, the oxidized working solution was removed from the oxidizer and extracted with water to remove hydrogen peroxide in the aqueous phase. The remaining working solution which was separated from the aqueous phase in the extractor was then recycled to the hydrogenator for additional processing. The catalyst descriptions, reactor size, and productivity of hydrogen peroxide in pounds per day per pound of catalyst are all shown in table II.

Runs D, E, and F—Prior Art Examples

The above runs, namely 2, 3 and 4, were duplicated using the prior art catalysts set forth in table II. The catalyst of run D was new, while the catalysts of runs E and F were used previously for 5 and 4 months, respectively, as anthraquinone hydrogenation catalysts. The results of these tests are set forth as examples D, E and F in table II.

In the above example, run 2 was continued for 1,579 hours during which the spherical catalyst of this invention retained 96 percent of its initial metal content. The catalyst used in run 4, after 7 months continuous use, retained over 96 percent of its original catalytic activity. Productivity of this catalyst was essentially unchanged during all of the runs, without regeneration.

In contrast to this, the dolomite catalyst of run E, after use for only 5 months, still had over 90 percent of the original metal, but had only 54 percent of its activity and had to be regenerated every 48 to 96 hours to maintain even this reduced activity. Microscopic examination of the dolomite catalyst showed that the metal still present was mainly in the cracks, crevices and pores of the catalyst and that there was little or no active metal left on the outer surfaces available for catalysis; by contrast, the catalyst of the invention retains the palladium metal on the entire surface of the supporting spherical carrier.

TABLE I

| Run | Size | Metal | Carrier | BET surface area (m.²/gm.) | Pore size (diam. in microns) | Reactor size | Productivity of (100%) $H_2O_2$, lb./day/lb. Catalyst | Palladium |
|---|---|---|---|---|---|---|---|---|
| 1 | 5/64 in. (2 mm.) sphere. | 0.3% palladium | Delta, theta-alumina | 90 | 0.06 | 1 in. x 4 ft | 12.1 | 4,050 |
| A | 10-16 mesh | do | Crushed dolomite | <5 | None measurable | 1 in. x 3 ft | 3.40 | 1,136 |
| B | 8-14 mesh | do | Corundum | <5 | do | 1 in. x 4 ft | 4.24 | 847 |
| C | 8-12 mesh | do | Activated alumina (alpha-alumina monohydrate). | 200 | 4.5-0.45 (average 1.8) | 1 in. x 4 ft | 5.4 | 1,780 |

TABLE II

| Run | Size | Metal | Carrier | BET surface area (m.²/gm.) | Pore size (diam. in microns) | Original condition | Reactor size | Productivity (100%) $H_2O_2$ |
|---|---|---|---|---|---|---|---|---|
| 2 | 5/64 in. (2 mm. sphere. | 0.3% palladium | Delta-, theta-alumina | 90 | Smaller than 0.06 | New | 5.4 in. x 7 ft. | 15.16 |
| 3 | do | do | do | 90 | do | New | 5.4 in. x 5 ft. | 12.9 |
| 4 | do | do | do | 90 | do | New | 5.0 ft. x 5 ft. | 5.5 |
| D | 10-16 mesh | do | Dolomite | <5 | Non-measurable | New | 5.4 in. x 10 ft. | 3.78 |
| E | do | 0.28% palladium | do | <5 | do | 5 months old. | 5.4 in. x 14.6 ft. | 2.03 |
| F | do | do | do | <5 | do | 4 months old. | 5.0 ft. x 7 ft. | 1.17 |

Pursuant to the requirements of the Patent Statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. A hydrogenation catalyst, especially useful for the catalytic hydrogenation of anthraquinone working compounds in the process of producing hydrogen peroxide, having a size of about 3 to about 65 mesh and consisting essentially of 0.05 to 5 percent by weight of metallic palladium dispersed essentially uniformly over the surface of crystalline alumina supporting spheres, said alumina supporting spheres:

a. consisting essentially of a member selected from the group consisting of delta-alumina and theta-alumina,
   b. being essentially free of either alpha-alumina, gamma-alumina, or alpha-alumina monohydrate,
c. having essentially no pores whose diameters are larger than about 0.06 micron,
d. having a BET surface area of about 90 to 200 m.²/g., and
e. having said metallic palladium penetrating into its surface pores no greater than about 50 microns.

2. The hydrogenation catalyst of claim 1 wherein the catalyst has a BET surface area of from about 90 to about 110 m.²/g.

3. The hydrogenation catalyst of claim 1 wherein the catalyst has about 0.3 percent by weight of palladium, has a size of about 10 mesh, and said alumina supporting spheres are predominantly theta-alumina and have a BET surface area of about 90 m.²/g.

* * * * *

UNITED STATES PATENT OFFICE
CERTIFICATE OF CORRECTION

Patent No. 3,635,841      Dated  January 18, 1972

Inventor(s) Carl D. Keith, Kurt W. Cornely and Nathan D. Lee

It is certified that error appears in the above-identified patent and that said Letters Patent are hereby corrected as shown below:

Abstract, line 3, "for" should read --of--.

Column 3, line 36, "60°-250bL C." should read --60°-250°C.--.

Table I, under "Pore Size (diam. in microns)", "0.06" should read --smaller than 0.06--.

Signed and sealed this 5th day of September 1972.

(SEAL)
Attest:

EDWARD M.FLETCHER,JR.
Attesting Officer

ROBERT GOTTSCHALK
Commissioner of Patents